(12) United States Patent
Bai et al.

(10) Patent No.: US 9,456,458 B2
(45) Date of Patent: Sep. 27, 2016

(54) METHOD AND APPARATUS FOR PRIORITIZING AN UPLINK RESOURCE REQUEST

(75) Inventors: Wei Bai, Beijing (CN); Jing Han, Chaoyang District (CN); Chunyan Gao, Beijing (CN); Haiming Wang, Beijing (CN); Asbjoern Groevlen, Frederiksberg (DK)

(73) Assignee: BROADCOM CORPORATION, Irvine, CA (US)

( * ) Notice: Subject to any disclaimer, the term of this patent is extended or adjusted under 35 U.S.C. 154(b) by 19 days.

(21) Appl. No.: 14/400,277

(22) PCT Filed: May 9, 2012

(86) PCT No.: PCT/CN2012/075244
§ 371 (c)(1),
(2), (4) Date: Nov. 10, 2014

(87) PCT Pub. No.: WO2013/166669
PCT Pub. Date: Nov. 14, 2013

(65) Prior Publication Data
US 2015/0208442 A1    Jul. 23, 2015

(51) Int. Cl.
*H04L 1/00* (2006.01)
*H04W 74/08* (2009.01)
*H04L 1/18* (2006.01)
*H04L 5/00* (2006.01)
*H04W 72/12* (2009.01)

(52) U.S. Cl.
CPC ........ *H04W 74/0833* (2013.01); *H04L 1/1854* (2013.01); *H04L 5/0055* (2013.01); *H04W 72/1242* (2013.01); *H04W 74/0875* (2013.01)

(58) Field of Classification Search
CPC ... H04W 72/04; H04W 72/05; H04W 72/06; H04W 72/0446; H04W 72/0447; H04W 72/0448
USPC ......................... 370/329, 315, 336, 230, 235
See application file for complete search history.

(56) References Cited

U.S. PATENT DOCUMENTS

| | | | |
|---|---|---|---|
| 2009/0235139 A1* | 9/2009 | Park | H04L 1/1819 714/750 |
| 2010/0290408 A1 | 11/2010 | Steudle et al. | |
| 2012/0077484 A1 | 3/2012 | Ji | |
| 2012/0195281 A1* | 8/2012 | Kim | H04W 72/1263 370/329 |

FOREIGN PATENT DOCUMENTS

WO     2010107354 A1    9/2010

* cited by examiner

*Primary Examiner* — Dady Chery
(74) *Attorney, Agent, or Firm* — Oblon, McClelland, Maier & Neustadt, L.L.P.

(57) ABSTRACT

A method, apparatus and computer program product are provided in order to allow an uplink resource request to be transmitted to the access point even in an instance in which the mobile terminal is receiving a continuous downlink transmission and repeated ACK/NACK transmissions are enabled. In this regard, a method, apparatus and computer program product are provided to prioritize a preamble transmission for a random access procedure relative to the repeated ACK/NACK transmissions. The method, apparatus and computer program also prioritize at least one message of the random access procedure.

14 Claims, 4 Drawing Sheets

METHOD AND APPARATUS FOR PRIORITIZING AN UPLINK RESOURCE REQUEST

TECHNOLOGICAL FIELD

An example embodiment of the present invention relates generally to uplink resource requests and, more particularly, to uplink resource requests that are made concurrent with a continuous downlink transmission and while repeated acknowledgment/negative acknowledgement transmissions are enabled.

BACKGROUND

In a Long Term Evolution (LTE) system, a mobile terminal having data or other signaling to transmit to the network may generate a buffer status report. While various types of uplink signaling may be transmitted from the mobile terminal to an access point, such as an evolved Node B (eNB), the uplink signaling may include an RLC STATUS PDU that is to be reported to an eNB for downlink transmission, a service establishment request that is to be transmitted to an eNB in the instance of a mobile originated (MO) call, radio resource control (RRC) reconfiguration complete signaling that is to be transmitted to an eNB to complete the procedure or acknowledgement/negative acknowledgement feedback for the transmission control protocol (TCP) layer.

The buffer status report is to be provided to an access point, such as an evolved Node B (eNB), so as to provide the access point with information regarding the buffer size in which the data or other signaling that the mobile terminal desires to transmit to the network is stored. The transmission of the buffer status report to the access point effectively requests an uplink grant.

The buffer status report is to be transmitted from the mobile terminal to the access point on the physical uplink shared channel (PUSCH). In an instance in which the mobile terminal does not have an uplink grant on PUSCH, the mobile terminal may initially transmit a scheduling request on the physical uplink control channel (PUCCH) to acquire the uplink grant on PUSCH that is required to report the buffer status report to the access point.

An LTE system also provides for acknowledgment/negative acknowledgment (ACK/NACK or A/N) repetition. ACK/NACK repetition is utilized to improve the PUCCH performance in an instance in which the uplink channel quality is poor for a particular mobile terminal. Once a mobile terminal is configured for ACK/NACK repetition, the mobile terminal will repeat the ACK/NACK transmission on PUCCH a predetermined number of times, such as 2, 4 or 6 times. During the time period that the mobile terminal is transmitting the repeated ACK/NACK transmission, the mobile terminal should not transmit other uplink signals. As such, in an instance in which there is a continuous downlink transmission to a mobile terminal and the mobile terminal is configured for ACK/NACK repetition, the mobile terminal may be unable to transmit the scheduling request to the access point to request an uplink grant since the mobile terminal is not allowed to transmit any other uplink signals while the mobile terminal is transmitting the repeated ACK/NACK transmissions.

A scheduling request counter may also be established to track the number of times that the mobile terminal attempts to transmit the scheduling request and to define the maximum number of times that the mobile terminal may attempt to transmit the scheduling request prior to experiencing a dedicated scheduling request (D-SR) failure and transitioning to a random access procedure. Thus, in instances in which the mobile terminal attempts to transmit the scheduling request, but is unable to do so because of the repeated ACK/NACK transmissions occurring during a continuous downlink transmission, the scheduling request counter may be increased in some situations. In instances in which the downlink transmission is sufficiently long so that the mobile terminal repeatedly fails to transmit the scheduling request and the scheduling request counter eventually satisfies a predefined threshold, the mobile terminal may experience D-SR failure. A random access procedure may then be triggered due to the D-SR failure in an effort to provide for the uplink transmission.

Once the random access procedure has been triggered, the medium access control (MAC) of the mobile terminal may select the preamble and the PRACH resource for transmission. The mobile terminal may also indicate the related information to the PHY layer, but the PHY layer may be unable to transmit the preamble and the PRACH resource due to a collision with the ACK/NACK transmissions. In this instance in which there is a continuous downlink transmission to the mobile terminal, the mobile terminal may be effectively deadlocked such that even if the mobile terminal had an opportunity for a uplink transmission at a later point in time, the mobile terminal would wait until another buffer status report and/or scheduling request is triggered and another random access procedure is initialized to resolve the deadlock since following a D-SR failure any subsequent scheduling request will also trigger a random access procedure.

Figure 1:
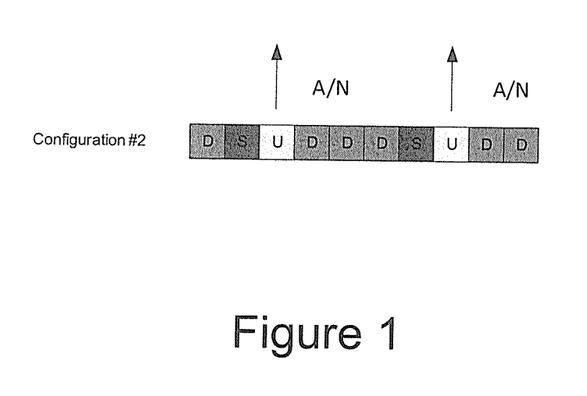
FIG. 1 illustrates a radio frame for TTD configuration #2.

The limitation upon the ability of a mobile terminal to obtain an uplink grant may happen infrequently in a frequency division duplex (FDD) scenario since the mobile terminal will have a uplink opportunity on every subframe. In FDD, the access point, such as the eNB, could reserve one or more subframes to be utilized for a scheduling request even in instances in which ACK/NACK repetition is configured. However, in a time division duplex (TDD) scenario, there are fewer uplink subframes such that the limitations upon obtaining an uplink grant may occur more frequently. For example, TDD configuration #2, which may be compatible with a time division synchronous code division multiple access (TD-SCDMA) system has only two uplink subframes within a radio frame as shown in FIG. 1 in which the uplink, downlink and special subframes are designated U, D and S, respectively.

Even if the ACK/NACK repetition factor is the lowest value, e.g., 2, once the access point, such as the eNB, schedules one downlink subframe, there would be at least one radio frame unavailable for the transmission of a scheduling request or a preamble. As such, a mobile terminal proximate the edge of a cell that is receiving a continuous downlink transmission may likely have to wait until the downlink transmission is completed in order to have an opportunity to request the uplink for the transmission of uplink data or signaling, thereby delaying the uplink transmission which may be disadvantageous in some instances.

In order to avoid D-SR failure and reliance upon a random access procedure, it has been proposed that the scheduling request counter not be increased in response to the failure to transmit a scheduling request due to repeated ACK/NACK transmissions. In this scenario, however, the mobile terminal may still be unable to notify the access point of the uplink data or other signaling that the mobile terminal desires to transmit via an uplink while the continuous downlink transmission proceeds and the repeated ACK/NACK transmissions are made during the various uplink opportunities. The mobile terminal in this instance would be required to wait until the downlink transmission was completed prior to having the opportunity to provide the buffer status report to the access point, thereby again disadvantageously delaying the request for an uplink grant.

BRIEF SUMMARY

A method, apparatus and computer program product are provided according to an example embodiment of the present invention in order to allow an uplink resource request to be transmitted to the access point even in an instance in which the mobile terminal is receiving a continuous downlink transmission and repeated ACK/NACK transmissions are enabled. As such, the mobile terminal of an example embodiment may be more readily granted access to an uplink and, in turn, to provide the uplink data or other signaling to the access point without substantial delay attributable to the continuous downlink transmission and the repeated ACK/NACK transmissions.

In one embodiment, a method is provided that includes prioritizing a preamble transmission for a random access procedure relative to the repeated ACK/NACK transmissions. The method of this embodiment also prioritizes at least one message of the random access procedure, such as Msg3, in an instance in which the preamble is transmitted or prioritized relative to the repeated ACK/NACK transmissions.

In another embodiment, an apparatus is provided that includes at least one processor and at least one memory including computer program code with the at least one memory and the computer program code configured to, with the processor, cause the apparatus to at least prioritize a preamble transmission for a random access procedure relative to repeated ACK/NACK transmissions. The at least one memory and the computer program code of this embodiment are also configured to, with the processor, cause the apparatus to prioritize at least one message of the random access procedure, such as Msg3, in an instance in which the preamble is transmitted or prioritized relative to the repeated ACK/NACK transmissions.

In a further embodiment, a computer program product is provided that includes at least one non-transitory computer-readable storage medium having computer-readable program instructions stored therein with the computer-readable program instructions including program instructions configured to prioritize the preamble transmission for a random access procedure relative to repeated ACK/NACK transmissions. The computer-readable program instructions of this embodiment also include program instructions configured to prioritize at least one message of the random access procedure, such as Msg3, in an instance in which the preamble is transmitted or prioritized relative to the repeated ACK/NACK transmissions.

In yet another embodiment, an apparatus is provided that includes means for prioritizing a preamble transmission for a random access procedure relative to repeated ACK/NACK transmissions. The apparatus of this embodiment also includes means for prioritizing at least one message of the random access procedure, such as Msg3, in an instance in which the preamble is transmitted or prioritized relative to the repeated ACK/NACK transmissions.

BRIEF DESCRIPTION OF THE DRAWINGS

Having thus described certain embodiments of the invention in general terms, reference will now be made to the accompanying drawings, which are not necessarily drawn to scale, and wherein:

DETAILED DESCRIPTION

The present invention now will be described more fully hereinafter with reference to the accompanying drawings, in which some, but not all embodiments of the inventions are shown. Indeed, these inventions may be embodied in many different forms and should not be construed as limited to the embodiments set forth herein; rather, these embodiments are provided so that this disclosure will satisfy applicable legal requirements. Like numbers refer to like elements throughout.

As used in this application, the term "circuitry" refers to all of the following: (a) hardware-only circuit implementations (such as implementations in only analog and/or digital circuitry) and (b) to combinations of circuits and software (and/or firmware), such as (as applicable): (i) to a combination of processor(s) or (ii) to portions of processor(s)/software (including digital signal processor(s)), software, and memory(ies) that work together to cause an apparatus, such as a mobile phone or server, to perform various functions) and (c) to circuits, such as a microprocessor(s) or a portion of a microprocessor(s), that require software or firmware for operation, even if the software or firmware is not physically present.

This definition of "circuitry" applies to all uses of this term in this application, including in any claims. As a further example, as used in this application, the term "circuitry" would also cover an implementation of merely a processor (or multiple processors) or portion of a processor and its (or their) accompanying software and/or firmware. The term "circuitry" would also cover, for example and if applicable to the particular claim element, a baseband integrated circuit or application specific integrated circuit for a mobile phone or a similar integrated circuit in server, a cellular network device, or other network device.

The method, apparatus and computer program product are provided in accordance with an example embodiment in order to allow an uplink resource request to be transmitted to the access point even in an instance in which the mobile terminal is receiving a continuous downlink transmission and repeated ACK/NACK transmissions are enabled. Although the method, apparatus and computer program product may be implemented in a variety of different system architectures, one example of a system that may be specifically configured in order to implement an example embodiment of the present invention is shown in FIG. 2.

Figure 2:
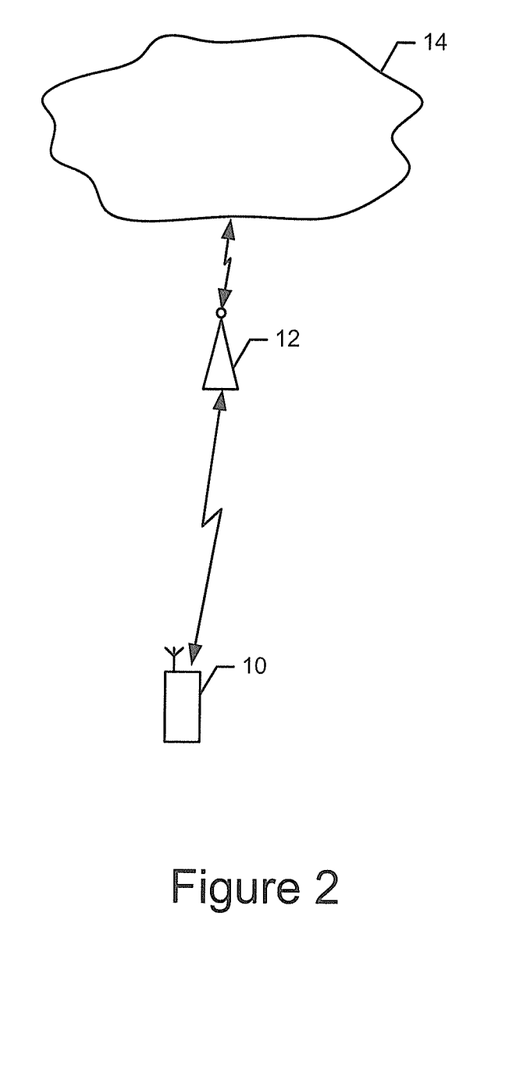
FIG. 2 is a block diagram of a system that may be specifically configured to support an uplink resource request in accordance with an example embodiment of the present invention.

Referring now to FIG. 2, a system that supports communications between a plurality of mobile terminals 10 (one of which is illustrated by way of example) and a network 14, such as an LTE network, an LTE-Advanced (LTE-A) network, a Global Systems for Mobile communications (GSM) network, a Code Division Multiple Access (CDMA) network, e.g., a Wideband CDMA (WCDMA) network, a CDMA2000 network or the like, a General Packet Radio Service (GPRS) network, an 802.11 network or other type of network, via an access point 12 is shown. Various types of mobile terminals may be employed including, for example, mobile communication devices such as mobile telephones, PDAs, pagers, laptop computers, tablet computers or any of numerous other hand held or portable communication devices, computation devices, content generation devices, content consumption devices, or combinations thereof. Regardless of the type of mobile terminal, the mobile terminal may communicate with the network via an access point, such as a base station, a Node B, an evolved Node B (eNB), a relay node or other type of access point.

Figure 3:
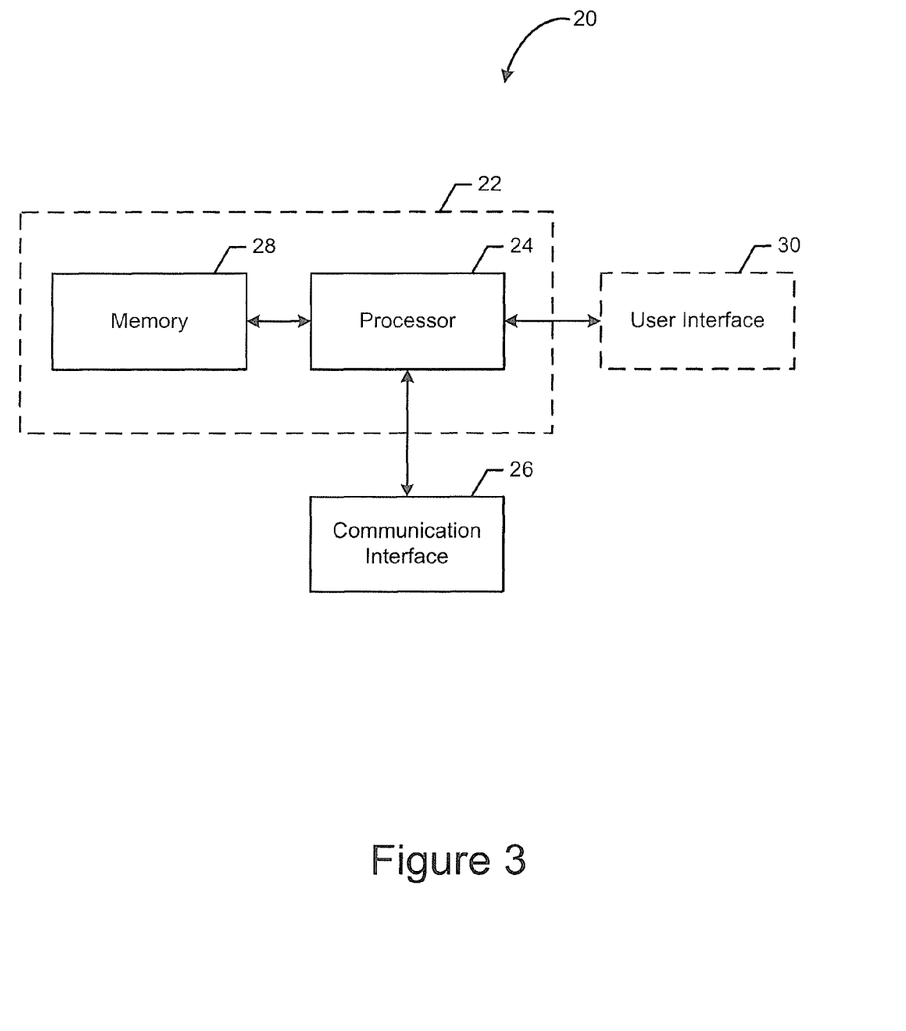
FIG. 3 is a block diagram of an apparatus that may be embodied by a mobile terminal and that may be specifically configured in accordance with an example embodiment of the present invention.

The mobile terminal 10 may embody or otherwise be associated with an apparatus 20 that is generally depicted in FIG. 3 and that may be configured to perform various operations in accordance with an example embodiment of the present invention as described below, such as in conjunction with FIG. 4. However, it should be noted that the components, devices or elements described below may not be mandatory and thus some may be omitted in certain embodiments. Additionally, some embodiments may include further or different components, devices or elements beyond those shown and described herein.

As shown in FIG. 3, the apparatus 20 may include or otherwise be in communication with a processing system including, for example, processing circuitry 22 that is configurable to perform actions in accordance with example embodiments described herein. The processing circuitry may be configured to perform data processing, application execution and/or other processing and management services according to an example embodiment of the present invention. In some embodiments, the apparatus or the processing circuitry may be embodied as a chip or chip set. In other words, the apparatus or the processing circuitry may comprise one or more physical packages (e.g., chips) including materials, components and/or wires on a structural assembly (e.g., a baseboard). The structural assembly may provide physical strength, conservation of size, and/or limitation of electrical interaction for component circuitry included thereon. The apparatus or the processing circuitry may therefore, in some cases, be configured to implement an embodiment of the present invention on a single chip or as a single "system on a chip." As such, in some cases, a chip or chipset may constitute means for performing one or more operations for providing the functionalities described herein.

In an example embodiment, the processing circuitry 22 may include a processor 24 and memory 26 that may be in communication with or otherwise control a communication interface 28 and, in at least some instances, a user interface 30. As such, the processing circuitry may be embodied as a circuit chip (e.g., an integrated circuit chip) configured (e.g., with hardware, software or a combination of hardware and software) to perform operations described herein. However, in some embodiments, the processing circuitry may be embodied as a portion of the mobile terminal 10.

The user interface 30 (if implemented in embodiments of the apparatus 20) may be in communication with the processing circuitry 22 to receive an indication of a user input at the user interface and/or to provide an audible, visual, mechanical or other output to the user. As such, the user interface may include, for example, a keyboard, a mouse, a joystick, a display, a touch screen, a microphone, a speaker, and/or other input/output mechanisms. In one embodiment, the user interface includes user interface circuitry configured to facilitate at least some functions of the mobile terminal 10, such as a mobile telephone, by receiving user input, such as via a touch screen, and providing output.

The communication interface 28 may include one or more interface mechanisms for enabling communication with other devices and/or networks. In some cases, the communication interface may be any means such as a device or circuitry embodied in either hardware, or a combination of hardware and software that is configured to receive and/or transmit data from/to a network 14 and/or any other device or module in communication with the processing circuitry 22, such as between the mobile terminal 10 and the access point 12. In this regard, the communication interface may include, for example, an antenna (or multiple antennas) and supporting hardware and/or software for enabling communications with a wireless communication network and/or a communication modem or other hardware/software for supporting communication via cable, digital subscriber line (DSL), universal serial bus (USB), Ethernet or other methods.

In an example embodiment, the memory 26 may include one or more non-transitory memory devices such as, for example, volatile and/or non-volatile memory that may be either fixed or removable. The memory may be configured to store information, data, applications, instructions or the like for enabling the apparatus 20 to carry out various functions in accordance with example embodiments of the present invention. For example, the memory could be configured to buffer input data for processing by the processor 24. Additionally or alternatively, the memory could be configured to store instructions for execution by the processor. As yet another alternative, the memory may include one of a plurality of databases that may store a variety of files, content or data sets. Among the contents of the memory, applications may be stored for execution by the processor in order to carry out the functionality associated with each respective application. In some cases, the memory may be in communication with the processor via a bus for passing information among components of the apparatus.

The processor 24 may be embodied in a number of different ways. For example, the processor may be embodied as various processing means such as one or more of a microprocessor or other processing element, a coprocessor, a controller or various other computing or processing devices including integrated circuits such as, for example, an ASIC (application specific integrated circuit), an FPGA (field programmable gate array), or the like. In an example embodiment, the processor may be configured to execute instructions stored in the memory 26 or otherwise accessible to the processor. As such, whether configured by hardware or by a combination of hardware and software, the processor may represent an entity (e.g., physically embodied in circuitry—in the form of processing circuitry) configured to perform operations according to embodiments of the present invention while configured accordingly. Thus, for example, when the processor is embodied as an ASIC, FPGA or the like, the processor may be specifically configured hardware for conducting the operations described herein. Alternatively, as another example, when the processor is embodied as an executor of software instructions, the instructions may specifically configure the processor to perform the operations described herein.

Figure 4:
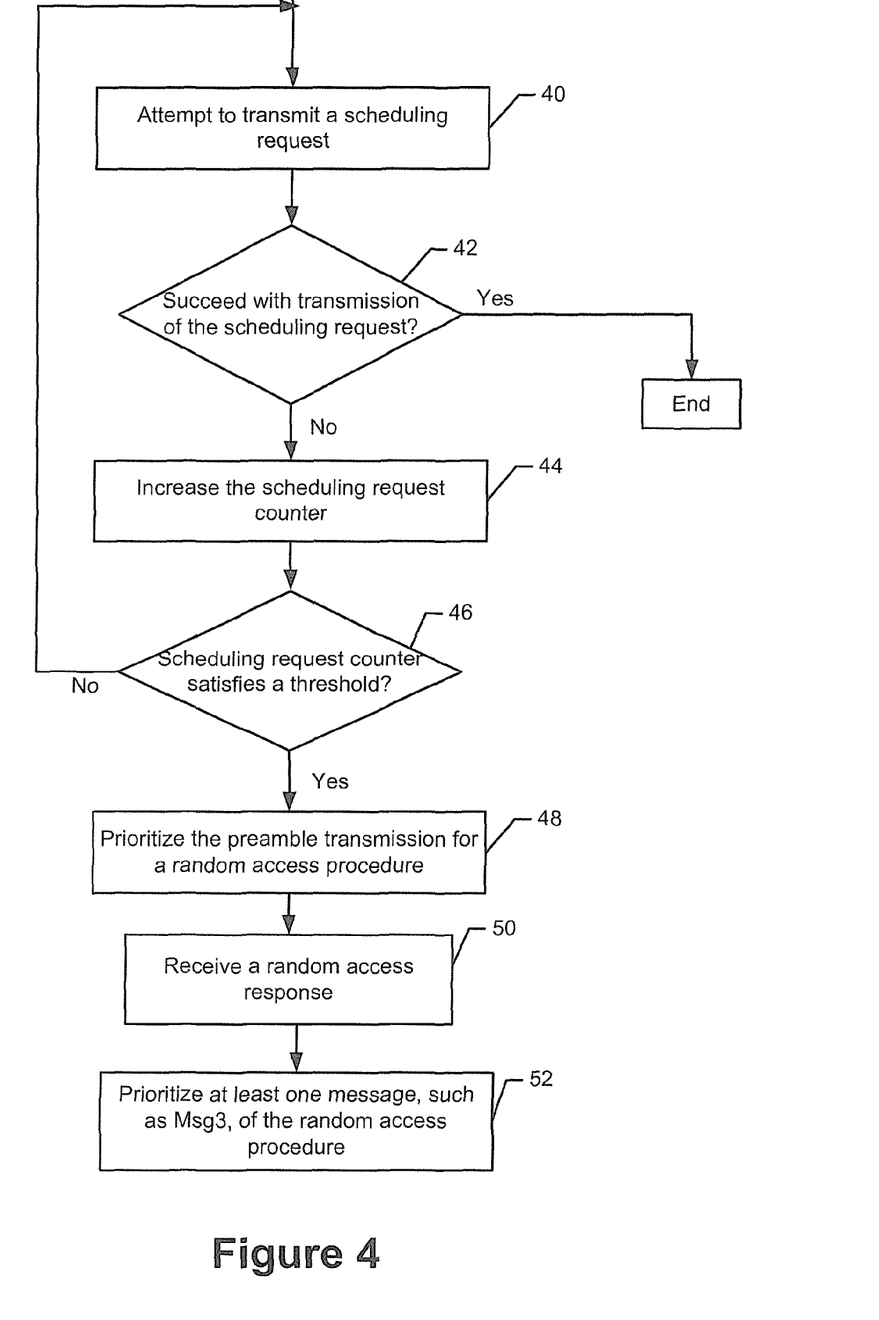
FIG. 4 is a flow chart illustrating operations performed in accordance with an example embodiment of the present invention.

Referring now to FIG. 4, the operations performed by a method, apparatus and computer program product of an example embodiment are illustrated from the perspective of an apparatus 20 that may be embodied by or otherwise associated with the mobile terminal 10. In this regard, an apparatus 20 may include means, such as the processing circuitry 22, the processor 24, the communication interface 28 or the like, for attempting to transmit a scheduling request. See operation 40. In this regard, a mobile terminal 10 that embodies the apparatus may have data or other signaling that the mobile terminal desires to transmit via an uplink to an access point 12, such as an eNB. As such, the apparatus, such as the processing circuitry, the processor, the communication interface or the like, may generate a buffer status report to provide information regarding the buffer size maintained by the apparatus, such as may be provided by memory 26, in order to store the data or other signaling that the mobile terminal desires to transmit via the uplink. The buffer status report is to be transmitted on the PUSCH. In an instance in which the mobile terminal does not have a uplink grant on the PUSCH, the apparatus, such as the processing circuitry, the processor, the communication interface or the like, may generate a scheduling request for transmission on the PUCCH so as to acquire an uplink grant on the PUSCH in order to provide the buffer status report to the access point.

As shown in operation 42, the apparatus 20 may include means, such as the processing circuitry 22, the processor 24, the communication interface 28 or the like, for determining whether the scheduling request, such as the scheduling request to be transmitted on the PUCCH or the buffer status report to be transmitted on the PUSCH, is successfully transmitted to the access point 12. In an instance in which the scheduling request is successfully transmitted, the mobile terminal 10 may obtain an uplink grant from the access point and may, in turn, transmit the uplink data or other signaling to the access point. However, in an instance in which the mobile terminal is receiving a continuous downlink transmission and in which repeated ACK/NACK repetition is enabled, the mobile terminal may be unable to transmit the scheduling request.

In this instance in which the mobile terminal 10 is unable to transmit the scheduling request, the apparatus 20 may include means, such as the processing circuitry 22, the processor 24, the memory 26 or the like, for updating, such as increasing, a scheduling request counter in response to an unsuccessful scheduling request. See operation 44 of FIG. 4. In this regard, a scheduling request counter may be maintained by the processing circuitry, the processor, the memory or the like for maintaining a count of the number of unsuccessful scheduling requests made by the mobile terminal 10 in an attempt to obtain a respective uplink grant. The apparatus may also include means, such as the processing circuitry, the processor, the memory or the like, for determining whether the scheduling request counter satisfies a predefined threshold. See operation 46. In one embodiment, the predefined threshold may establish the maximum number of attempts that a mobile terminal may make in order to attempt to transmit a scheduling request prior to utilizing a random access procedure. In an instance in which the scheduling request counter is determined not to satisfy the threshold, such as by being less the predefined threshold, the apparatus may again attempt to transmit a scheduling request and the foregoing process illustrated by operations 40-46 may be repeated until such time that the scheduling request is successfully transmitted or that the scheduling request counter satisfies the predefined threshold.

In an instance in which the scheduling request counter is determined to satisfy the predefined threshold, however, the apparatus 20 may be configured to modify its behavior in order to transmit the scheduling request and to obtain the uplink grant for transmission of the uplink data or other signaling even in an instance in which the mobile terminal 10 is receiving a continuous downlink transmission and repeated ACK/NACK transmissions are enabled. In the regard, the apparatus 20 may include means, such as the processing circuitry 22, the processor 24, the communication interface 28 or the like, the prioritizing the preamble transmission for a random access procedure relative to the repeated ACK/NACK transmissions. See operation 48. In this regard, the prioritization of the preamble transmission may result in the establishment or setting of a higher priority for the preamble transmission than for the repeated ACK/NACK transmissions. By prioritizing the preamble transmission for the random access procedure relative to the repeated ACK/NACK transmissions, the mobile terminal 10 may transmit the preamble via an uplink even though the mobile terminal receives continuous downlink transmissions and is enabled for repeated ACK/NACK transmissions.

The apparatus 10 of this embodiment may also include means, such as the processing circuitry 22, the processor 24, the communication interface 28 or the like, for receiving a random access response, such as from the access point 12, in response to the transmission of the preamble and the successful receipt of the preamble, such as by the access point. See operation 50 of FIG. 4. In response to the receipt of the random access response, the apparatus may also include means, such as the processing circuitry, the processor, the communication interface or the like, for prioritizing at least one message of the random access procedure in an instance in which the preamble is transmitted or prioritized relative to the repeated ACK/NACK transmissions. See operation 52. In this regard, at least one message of the random access procedure may be prioritized relative to the repeated ACK/NACK transmissions, such as by establishing or setting a higher priority for the at least one prioritized message than for the repeated ACK/NACK transmissions. In one embodiment, once the preamble is transmitted or prioritized, at least one message of the random access procedure, such as Msg3 as discussed below, may always be prioritized even if the prioritized message collides with the ACK/NACK repetition. Thus, the mobile terminal 10 may successfully transmit the at least one prioritized message, such as to the access point, even while the mobile terminal is receiving continuous downlink transmissions and is enabled for repeated ACK/NACK transmissions. While various messages of the random access procedure may be prioritized, the apparatus, such as the processing circuitry, the processor, the communication interface or the like, of one embodiment may prioritize at least message 3 (Msg3) of the random access procedure to substantially increase the likelihood that Msg3 will be transmitted by the mobile terminal via the uplink and received by the access point. In one embodiment Msg3 may be transmitted as part of the random access procedure on the uplink shared channel (UL-SCH) and may include a cell radio network temporary identifier (C-RNTI) media access control (MAC) cyclic extension (CE) or common control channel (CCCH) service data unit (SDU), submitted from an upper layer and associated with the contention resolution identity.

Although the prioritization of the preamble and at least one message of the random access procedure relative to the repeated ACK/NACK transmissions may delay or prevent a transmission of one or more ACK/NACK transmissions, the prioritization of the preamble and at least one message of the random access procedure may permit the mobile terminal 10 to request an uplink grant even while the mobile terminal continues to receive a continuous downlink transmission and even while repeated ACK/NACK transmissions are enabled so as to permit the mobile terminal to transmit the uplink data and/or other signaling to the access point 12 with less delay.

One example of a situation (the scheduling request counter satisfying the predefined threshold) in which the preamble and at least one message of the random access procedure are prioritized relative to the repeated ACK/NACK transmissions is described above. However, the preamble and at least one message of the random access procedure, e.g., Msg3, may also or alternatively be prioritized in other situations. For example, in an instance in which there is no scheduling request configured, a random access procedure including the prioritization of the preamble and at least one message of the random access procedure may be triggered in response to the generation of a buffer status report.

As noted above, FIG. 4 is a flowchart illustrating the operations performed by a method, apparatus and computer program product, such as apparatus 20 of FIG. 3, from the perspective of a mobile terminal 10 in accordance with one embodiment of the present invention. It will be understood that each block of the flowchart, and combinations of blocks in the flowchart, may be implemented by various means, such as hardware, firmware, processor, circuitry and/or other device associated with execution of software including one or more computer program instructions. For example, one or more of the procedures described above may be embodied by computer program instructions. In this regard, the computer program instructions which embody the procedures described above may be stored by the memory 26 of an apparatus employing an embodiment of the present invention and executed by a processor 24 of the apparatus. As will be appreciated, any such computer program instructions may be loaded onto a computer or other programmable apparatus (e.g., hardware) to produce a machine, such that the resulting computer or other programmable apparatus provides for implementation of the functions specified in the flowchart blocks. These computer program instructions may also be stored in a non-transitory computer-readable storage memory that may direct a computer or other programmable apparatus to function in a particular manner, such that the instructions stored in the computer-readable storage memory produce an article of manufacture, the execution of which implements the function specified in the flowchart blocks. The computer program instructions may also be loaded onto a computer or other programmable apparatus to cause a series of operations to be performed on the computer or other programmable apparatus to produce a computer-implemented process such that the instructions which execute on the computer or other programmable apparatus provide operations for implementing the functions specified in the flowchart blocks. As such, the operations of FIG. 4, when executed, convert a computer or processing circuitry into a particular machine configured to perform an example embodiment of the present invention. Accordingly, the operations of FIG. 4 define an algorithm for configuring a computer or processing circuitry, e.g., processor, to perform an example embodiment. In some cases, a general purpose computer may be provided with an instance of the processor which performs the algorithm of FIG. 4 to transform the general purpose computer into a particular machine configured to perform an example embodiment.

Accordingly, blocks of the flowchart support combinations of means for performing the specified functions and combinations of operations for performing the specified functions. It will also be understood that one or more blocks of the flowchart, and combinations of blocks in the flowchart, can be implemented by special purpose hardware-based computer systems which perform the specified functions, or combinations of special purpose hardware and computer instructions.

In some embodiments, certain ones of the operations above may be modified or further amplified as described below. Moreover, in some embodiments additional optional operations may also be included. It should be appreciated that each of the modifications, optional additions or amplifications may be included with the operations above either alone or in combination with any others among the features described herein.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Moreover, although the foregoing descriptions and the associated drawings describe example embodiments in the context of certain example combinations of elements and/or functions, it should be appreciated that different combinations of elements and/or functions may be provided by alternative embodiments without departing from the scope of the appended claims. In this regard, for example, different combinations of elements and/or functions than those explicitly described above are also contemplated as may be set forth in some of the appended claims. Although specific terms are employed herein, they are used in a generic and descriptive sense only and not for purposes of limitation.

That which is claimed:

1. A method comprising:
    attempting, with circuitry, transmission of a scheduling request during continuous downlink transmissions and repeated acknowledgement/negative acknowledgement (ACK/NACK) transmissions;
    incrementing, with the circuitry, a count value if transmission of the scheduling request fails;
    determining, with circuitry, whether the count value exceeds a predetermined threshold; and
    when the count value exceeds a predetermined threshold:
        prioritizing, with the circuitry, a preamble transmission for a random access procedure relative to the repeated (ACK/NACK) transmissions, and
        prioritizing, with the circuitry, at least one message for the random access procedure in an instance in which the preamble is transmitted or prioritized relative to the repeated ACK/NACK transmissions.

2. The method according to claim 1 wherein prioritizing the preamble transmission comprises setting a higher priority for the preamble transmission than for the repeated ACK/NACK transmissions.

3. The method according to claim 1 wherein prioritizing the preamble transmission comprises prioritizing the preamble transmission in response to a buffer status report being generated.

4. The method according to claim 1 wherein prioritizing at least one message comprises prioritizing Msg3 for the random access procedure.

5. The method according to claim 1 further comprising receiving a random access response in response to the preamble transmission, and wherein prioritizing the at least one message comprises prioritizing the at least one message following receipt of the random access response.

6. An apparatus comprising:
circuitry configured to:
attempt transmission of a scheduling request during continuous downlink transmissions and repeated acknowledgement/negative acknowledgement (ACK/NACK) transmissions;
increment a count value if transmission of the scheduling request fails;
determine whether the count value exceeds a predetermined threshold; and
when the count value exceeds a predetermined threshold:
prioritize a preamble transmission for a random access procedure relative to the repeated (ACK/NACK) transmissions; and
prioritize at least one message for the random access procedure in an instance in which the preamble is transmitted or prioritized relative to the repeated ACK/NACK transmissions.

7. The apparatus according to claim 6 wherein the circuitry is further configured to prioritize the preamble transmission by setting a higher priority for the preamble transmission than for the repeated ACK/NACK transmissions.

8. The apparatus according to claim 6 wherein the circuitry is further configured to prioritize the preamble transmission by prioritizing the preamble transmission in response to a buffer status report being generated.

9. The apparatus according to claim 6 wherein the circuitry is further configured to prioritize at least one message by prioritizing Msg3 for the random access procedure.

10. The apparatus according to claim 6 wherein the circuitry is further configured to receive a random access response in response to the preamble transmission, and prioritize the at least one message by prioritizing the at least one message following receipt of the random access response.

11. The apparatus according to claim 6 wherein the apparatus is embodied by a mobile telephone.

12. The apparatus according to claim 11, wherein the circuitry is further configured to facilitate user control of at least some functions of the mobile telephone through use of a display.

13. A non-transitory computer-readable storage medium having computer-readable instructions thereon that, when executed by a processor, cause the processor to perform a method comprising:
attempting transmission of a scheduling request during continuous downlink transmissions and repeated acknowledgement/negative acknowledgement (ACK/NACK) transmissions;
incrementing a count value if transmission of the scheduling request fails;
determining whether the count value exceeds a predetermined threshold; and
when the count value exceeds a predetermined threshold:
prioritizing a preamble transmission for a random access procedure relative to the repeated (ACK/NACK) transmissions, and
prioritizing at least one message for the random access procedure in an instance in which the preamble is transmitted or prioritized relative to the repeated ACK/NACK transmissions.

14. The non-transitory computer-readable storage medium according to claim 13 further comprising prioritizing the preamble transmission comprise program instructions configured to set a higher priority for the preamble transmission than for the repeated ACK/NACK transmissions.

* * * * *